(12) United States Patent
Khosla et al.

(10) Patent No.: US 8,010,658 B2
(45) Date of Patent: Aug. 30, 2011

(54) INFORMATION PROCESSING SYSTEM FOR CLASSIFYING AND/OR TRACKING AN OBJECT

(75) Inventors: Deepak Khosla, Camarillo, CA (US); James Guillochon, San Diego, CA (US); Howard C. Choe, Southlake, TX (US)

(73) Assignee: Raytheon Company, Waltham, MA (US)

( * ) Notice: Subject to any disclaimer, the term of this patent is extended or adjusted under 35 U.S.C. 154(b) by 580 days.

(21) Appl. No.: 12/027,588

(22) Filed: Feb. 7, 2008

(65) Prior Publication Data

US 2008/0235318 A1    Sep. 25, 2008

Related U.S. Application Data

(60) Provisional application No. 60/889,184, filed on Feb. 9, 2007.

(51) Int. Cl.
*G06F 15/173* (2006.01)

(52) U.S. Cl. ........ 709/224; 709/203; 709/206; 709/223; 382/103; 382/154; 382/187

(58) Field of Classification Search .............. 709/224
See application file for complete search history.

(56) References Cited

U.S. PATENT DOCUMENTS

| | | | | |
|---|---|---|---|---|
| 5,842,156 A * | 11/1998 | Hong et al. | ..... | 702/179 |
| 6,014,447 A * | 1/2000 | Kohnen et al. | ..... | 381/86 |
| 6,269,324 B1 * | 7/2001 | Rakijas et al. | ..... | 702/190 |
| 6,393,137 B1 * | 5/2002 | Chen et al. | ..... | 382/103 |
| 6,829,568 B2 | 12/2004 | Julier et al. | ..... | 702/189 |
| 7,005,981 B1 | 2/2006 | Wade | ..... | 340/539.17 |
| 7,035,764 B2 | 4/2006 | Rui et al. | ..... | 702/179 |

FOREIGN PATENT DOCUMENTS

EP    1 596 334    11/2005

OTHER PUBLICATIONS

L.Xiao, S. Boyd, S. Lall, "A Scheme for Robust Distributed Sensor Fusion Based on Average Consensus," *Information Processing in Sensor Networks*, pp. 63-70, Apr. 15, 2005.

K. Kastella, "Discrimination Gain to Optimize Detection and Classification," *IEEE Transactions on Systems, Man, and Cybernetics, Part A, Systems and Humans*, vol. 27, No. 1, pp. 112-116, Jan. 1997.

V. Krishnamurthy, D. Evans, "Hidden Markov Model Multiarm Bandits; a Methodology for Beam Scheduling in Multitarget Tracking," *IEEE Trans. Signal Process.* (pp. 2893-2908), 2001.

D. P. Bertsekas, D. Castanon, "Rollout Algorithms for Stochastic Scheduling Problems," *J. Heuristics*, pp. 1-25, 1998.

M. K. Schneider, G.L. Mealy, and F. M. Pait, "Closing the Loop in Sensor Fusion Systems; Stochastic Dynamic Programming Approaches," *Proceedings of the 2004 American Control Conf*, vol. 5, pp. 4752-4757, 2004.

(Continued)

*Primary Examiner* — Yasin Barqadle
*Assistant Examiner* — Hua Fan
(74) *Attorney, Agent, or Firm* — Baker Botts L.L.P.

(57) ABSTRACT

According to one embodiment, a computing system includes a computing node coupled to a number of sensors. The sensors are operable to generate records from received information and transmit these records to the computing node. The computing node is operable to bind the plurality of records in a plurality of classifications using a multiple level classifier such that each classification has a differing level of specificity.

11 Claims, 5 Drawing Sheets

OTHER PUBLICATIONS

R. E. Kalman, "A New Approach to Linear Filtering and Prediction Problems," *Transactions of the ASME—Journal of Basic Engineering 82(D)*, 12 pages, 1960.

M. J. Kearns, Y. Mansour, and A.Y. Ng, "A Sparse Sampling Algorithm for Near-Optimal Planning in Large Markov Decision Processes,"*Proceedings of the Sixteenth International Joint Conference on Artificial Intelligence*, 8 pages, 1999.

A. Makarenko, H.F. Durrant-Whyte, "Decentralized Data Fusion and Control in Active Sensor Networks," *7th Int. Conf on Info Fusion*, 8 pages, 2004.

A. D'Costa, A. M. Sayeed, "Data Versus Decision Fusion for Distributed Classification in Sensor Networks," *Military Communications Conference*, pp. 890-894, 2003.

T. Clouquer, P. Ramanthan, K.K. Saluja, K. Wang, "Value-Fusion versus Decision-Fusion for Fault-Tolerance in Collaborative Target Detection in Sensor Networks," *Proceedings of Fourth International Conference on Information Fusio*, 6 pages, Aug. 2001.

X. Wang, G. Foliente, Z. Su, L. Ye, "Multilevel Decision Fusion in a Distributed Active Sensor Network for Structural Damage Detection," *Structural Health Monitoring*, pp. 45-58, 2006.

A. W. Stroupe, M.C. Martin, T. Balch, "Distributed Sensor Fusion for Object Position Estimation by Multi-Robot Systems," *Robotics and Automation*, pp. 1092-1098, vol. 2, 2001.

R. R. Brooks, P. Ramanthan, A. M. Sayeed, "Distributed Target Classification and Tracking in Sensor Networks," *Signal Processing Magazine, IEEE*, pp. 1163-1171, 2003.

H. Qi, X. Wang, S.S. Iyengar, K. Chakrabarty, "Multisensor Data Fusion in Distributed Sensor Networks Using Mobile Agents," *Proceedings of 5th International Conf on Information Fusion*, 6 pages, 2005.

B. Grocholslcy, J.F. Durrant-White, P. Gibbens, "An Information-Theoretic Approach to Decentralized Control of Multiple Autonomous Flight Vehicles," *The University of Sydney*, 12 pages, 2000.

P. Ogren, E. Fiorelli, N.E. Leonard, "Cooperative Control of Mobile Sensor Networks; Adaptive Gradient Climbing in a Distributed Environment," *Automatic Control, IEEE Transactions*, pp. 1292-1302, 2004.

N. Xiong, P. Svensson, "Multi-Sensor Management for Information Fusion: Issues and Approaches," *Information Fusion*, vol. 3, pp. 163-186, 2002.

L.Y. Pao, N.T. Baltz, "Control of Sensor Information in Distributed Multisensor Systems," *American Control Conference*, pp. 2397-2401, 1999.

M. Chu, H. Haussecker, F. Zhao, "Scalable Information-Driven Sensor Querying and Routing for Ad Hoc Heterogeneous Sensor Networks,"*International Journal of High-Performance Computing Applications*, 17 pages, 2002.

F. Zhao, J. Shin, J. Reich, "Information-Driven Dynamic Sensor Collaboration for Tracking Applications," *IEEE Signal Processing Magazine*, 8 pages, 2002.

B. Horling, R. Mailler, M. Sims, V. Lesser, "Using and Maintaining Organization in a Large-Scale Sensor Network," *Proc. of Workshop on Autonomy, Delegation, and Control*, U of Mass, 8 pages, 2003.

H. Wang, K. Yao, D. Estrin, "Information-theoretic Approaches for Sensor Selection and Placement in Sensor Networks for Target Localization and Tracking," *Journal of Communications and Networks*, pp. 438-449, 2005.

M. Rabbat, R. Nowak, "Distributed Optimization in Sensor Networks," *Proceedings of the Third Intl. Symposium on Information Processing in Sensor Networks*, 8 pages, 2004.

A. Savkin, R. Evans, E. Skafidas, "The Problem of Optimal Robust Sensor Scheduling," *paper—Australian Research Council and the Centre of Expertise in Networked Decision Systems*, 6 pages, 2000.

S. Kullback and R. A. Leibler, "On Information and Sufficiency," *The Annals of Mathematical Statistics*, pp. 79-86.

K. Kastella, "Discrimination Gain to Optimize Detection and Classification," *IEEE Transactions on Systems, Man, and Cybernetics, Par A: Systems and Humans* 7 pages, 1995.

S. Musick, K. Kastella, "Comparison of Sensor Management Strategies for Detection and Classification," *9th National Symposium on Sensor Fusion*; 23 pages, Mar. 1996.

A. Willsky, M. Bello, D. Castanon, B. Levy, G. Verghese, "Combining and Updating of Local Estimates and Regional Maps Along Sets of One-Dimensional Tracks," *Automatic Control, IEEE Transaction*, pp. 799-813, Aug. 1982.

T. H. Chung, V. Gupta, J.W. Burdick, R.M. Murray, "On a Decentralized Active Sensing Strategy Using Mobile Sensor Platforms in a Network," *Decision and Control*, 6 pages, Dec. 2004.

A. Vailaya, M.A.T. Figueiredo, A.K. Jain, Z. Hong-Jiang Zhang, "Image Classification for Context-Based Indexing," *Image Processing, IEEE Transactions*, pp. 117-130, Jan. 2001.

D. Koller, M. Sahami, "Hierarchically Classifying Documents Using Very Few Words," *Proc of the 14th Intl Conference on Machine Learning*, 9 pages, 1997.

D.J.C. MacKay, "Bayesian Interpolation," *Neural Computation*, 27 pages, May 1992.

U.S. Appl. No. 12/018,036, entitled "Information Processing System," 28 pages, Jan. 22, 2008.

Tharmarasa et al., "Multitarget-Multisensor Management for Decentralized Sensor Networks," SPIE, vol. 6236, pp. 1-11, 2006.

Schmaedeke, "Information based sensor management," Paramax Systems Corporation, SPIE, vol. 1955, pp. 156-164, 1993.

McIntyre et al., "An Information Theoretic Approach to Sensor Scheduling," Dept. of Electrical and Computer Engineering, SPIE vol. 2755, pp. 304-312, Apr. 1996.

Nash, "Optimal Allocation of Tracking Resources," ORINCON Corporation, pp. 1177-1180, Dec. 1977.

Washburn et al., "Stochastic Dynamic Programming Based Approaches to Sensor Resource Management," Fusion Technology and Systems Division, Alphatech, Inc., 8 pages, 1997.

Hashemipour et al., "Technical Notes and Correspondence," IEEE Transactions on Automatic Control., vol. 33, No. 1, pp. 88-94, Jan. 1988.

Hintz et al., "Multi-Process Constrained Estimation," IEEE, vol. 21, No. 1, pp. 237-244, Jan./Feb. 1991.

Hintz, "A Measure of the Information Gain Attributable to Cueing," IEEE, vol. 21, No. 2, pp. 434-442, Mar./Apr. 1991.

Manyika et al., "An Information-theoretic Approach to Management in Decentralized Data Fusion," Oxford University, Robotics Research Group, Dept. of Engineering Science, SPIE vol. 1828 Sensor Fusion V, pp. 202-213, 1992.

Manyika et al., "On Sensor Management in Decentralized Data Fusion," Oxford University, Robotics Research Group, Dept. of Engineering Science, IEEE, pp. 3506-3507, Dec. 1992.

Gaskell et al., "Sensor Models and a Framework for Sensor Management," Robotics Research Group, Oxford University, SPIE vol. 2059 Sensor Fusion VI, pp. 2-13, 1993.

Schmaedeke et al., "Event-averaged maximum likelihood estimation and information based sensor management," UNISYS Government Systems Group, SPIE vol. 2232, pp. 91-96, Mar. 8, 1994.

Lopez et al., "Fuzzy Reasoning for Multisensor Management," IEEE, Dpto. Informatica, Universidad Carlos III de Madrid, pp. 1398-1403, 1995.

Malhotra, "Temporal Considerations in Sensor Management," IEEE, pp. 86-93, 1995.

L. Mo, X. Song, Y. Zhou, Z. Sun, and Y. Bar Shalom, "Unbiased Converted Measurements for Tracking," IEEE, pp. 1023-1027, 1998.

Mahler, "Global posterior densities for sensor management," Lockheed Martin Tactical Defense Systems, SPIE vol. 3365, pp. 252-263, Apr. 1998.

Mahler, "Multisource, multitarget filtering: A unified approach," Lockheed Martin Tactical Defense Systems, SPIE vol. 3373, pp. 296-307, Apr. 1998.

Musick et al., "A practical implementation of joint multitarget probabilities," Air Force Research Laboratory, SPIE vol. 3374, pp. 26-37, Apr. 1998.

Schmaedeke et al., "Information Based Sensor Management and IMMKF," SPIE vol. 3373, pp. 390-401, Apr. 1998.

Zhang et al., "Resource Management of Task Oriented Distributed Sensor Networks," University of Miami, IEEE, pp. 513-516, 2001.

Krishnamurthy, "Algorithms for Optimal Scheduling and Management of Hidden Markov Model Sensors," IEEE, vol. 50, No. 6, pp. 1382-1397, Jun. 2002.

Bar-Shalom et al., "One-Step Solution for the Multistep Out-of-Sequence-Measurement problem in Tracking," IEEE Transactions on Aerospace and Electronic Systems, vol. 40, No. 1, pp. 27-37, Jan. 2004.

Pucar, Predrag; and Norberg, Par; "Decentralized Sensor Fusion and Support Using Multiple Models," SPIE vol. 3068-XP-002407865, pp. 20-31, Jan. 1, 1997.

Coue, C.; Fraichard, Th.; Besiere, P.; and Mazer, E. Multi-Sensor Data Fusion Using Bayesian Programming: an Automative Application; Intelligent Vehicle Symposium; IEEE, pp. 442-447, Jun. 17, 2002.

Nicosevici, Tudor; Garcia, Rafael; Carreras, Marc; and Villanueva, Miguel; "A Review of Sensor Fusion Techniques for Underwater Vehicle Navigation," IEEE Techno-Ocean 04, pp. 1600-1605, Nov. 9, 2004.

Extended European Search Report for application No. 08002402.9/ patent No. 1956520, EPO, 8 pages, Jun. 2, 2009.

Mahler, Ronald; "Global Optimal Sensor Allocation," 9th National Sensor Fusion, vol. I, pp. 347-366, Mar. 13, 1996.

Intanagonwiwat, Chalermek, Givondan, Ramesh, and Estrin, Deborah; "Directed Diffusion: A Scalable and Robust Communication Parpadigm for Sensor Networks," MOBICOM 2000, Boston, MA, USA, pp. 56-67, 2000.

Thomopoulos, Stelios, Viswanathan, Ramanarayanan, Bougoulias, Dimitrios, and Zhang, Lei; "Optimal and Suboptimal Distributed Decision Fusion," Dept of Electrical Engineering, Southern Illinois University, pp. 414-418, 1988.

Munkres, James; "Algorithms for the Assignment and Transportation Problems," J. Soc. Indust. Appl. Math. vol. 5, No. 1, pp. 32-38, Mar. 1957.

Communication Pursuant to Article 94(3) EPC from EPO Substantive, for Application No. 08 002 402.9-2218, JL 53750P.EPP, dated Jan. 31, 2011; 5 pages.

Martin Oxenham, Subhash Challa, and Mark Morelande, "Fusion of disparate identity estimates for shared situation awareness in a network-centric environment"; ScienceDirect Information Fusion 7 (2006) pp. 395-417.

Weiqun Shi, Ronald Fante, John Yoder, and Gregory Crawford, "Multi-Modal Netted Sensor Fence for Homeland Security"; the MITRE Corp., Bedford, MA, Unattended Ground Sensor Technologies and Applications VII. Edited by Carapezza, Edward M., Proceedings of SPIE vol. 5796 (2005), pp. 416-427.

Declaration Pursuant to 37 C.F.R. 1.132 executed by Howard C. Choe; (2 pages), Dec. 1, 2009.

Choe, Howard C.; "Combat ID in the Maritime Domain to Reveal Contact Internt"; (white paper-redacted), submitted by Raytheon Company and submitted to Office of Naval Research, Arlington, VA; (15 pages), Apr. 21, 2006.

Bonnet, P., et al., "Towards Sensor Database Systems," Mobile Data Management, Second International Conference, MDM 2001 Proceedings (Lecture Notes in Computer Science, vol. 1987) Springer-Verlag Berlin, Germany, 2001, pp. 3-12 (10 pgs), 1987.

Chaudhuri, S., et al., "An Overview of Data Warehousing and OLAP Technology," SIGMON Record, New York, NY, vol. 26, No. 1, Mar. 1, 1997, pp. 65-74 (10 pgs).

Alimhed-Torsten Grust et al., "Phenomenon-Aware Sensor Database Systems," Current Trends in Database Technology EDBT 2006, Lecture Notes in Computer Science, vol. 4254, Jan. 1, 2006, pp. 1-9 (9 pgs).

Han, et al., "An Infrastructure of Stream Data Mining, Fusion and Management for Monitored Patients," Proceedings of the 19th IEEE Symposium on Computer-Based Medical Systems, Salt Lake City, UT, Jun. 22-23, 2006, pp. 461-465 (5 pgs).

U.S. Appl. No. 12/398,277, entitled "Information Processing System," (28 pages), Mar. 5, 2009.

Communication Pursuant to Article 94(3) EPC from EPO Substantive for Application No. 08 728 208.3- 2201; 4 pages, Apr. 19, 2010.

Communication Pursuant to Article 94(3) EPC from EPO Substantive Examiner M. Jaedicke, for Application No. 08 728 208.3-2201, JL, 53538P.EPP, dated Apr. 20, 2011; 5 pages.

* cited by examiner

INFORMATION PROCESSING SYSTEM FOR CLASSIFYING AND/OR TRACKING AN OBJECT

RELATED APPLICATIONS

This application claims priority to U.S. Provisional Patent Application Ser. No. 60/889,184, entitled "COMPUTER IMPLEMENTED METHOD FOR CLASSIFYING AN OBJECT," which was filed on Feb. 9, 2007.

TECHNICAL FIELD OF THE DISCLOSURE

This disclosure generally relates to computing systems, and more particularly, to an information processing system for classifying an object and a method of performing the same.

BACKGROUND OF THE DISCLOSURE

Distributed computing systems delegate processing load over a number of constituent computing nodes. Distributed computing systems may provide relatively efficient use of computing resources by distributing processing load of multiple users. Computing nodes of a distributed computing system often communicate with one another through a network, such as the Internet or a wireless network using radio frequency (RF) links.

SUMMARY OF THE DISCLOSURE

According to one embodiment, a computing system includes a computing node coupled to a number of sensors. The sensors are operable to generate records from received information and transmit these records to the computing node. The computing node is operable to bind the plurality of records in a plurality of classifications using a multiple level classifier such that each classification has a differing level of specificity.

Some embodiments of the disclosure may provide numerous technical advantages. For example, one embodiment of the information processing system may be relatively more immune to noise using the multiple levels of classification provided by multiple level classifier. Sensors may generate information at varying levels of perception. The multiple level classifier may combine useable information having differing levels of perception by recursively classifying this information in multiple classification levels. Noise introduced by sensors may be filtered, therefore, with a greater level of granularity.

As another example, information processing system may be implemented in a distributed architecture for enhanced robustness against individual sensor failure. That is, the loss of a single sensor in a distributed architecture may not impact the overall performance of the information processing system. While the loss of an important node in a centralized network can drop system efficiency dramatically, the loss of any computing node in a distributed network might reduce the system efficiency only marginally. In addition, the information processing system configured in a distributed architecture may have lighter communication requirements in environments with a relatively large amount of noise.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS OF THE PRESENT DISCLOSURE

As previously described, network computing systems may distribute processing load to a number of constituent computing nodes coupled together through a network. Distributed computing systems have certain advantages over their centralized counterparts. For example, they may provide parallel processing techniques to ease computational burden, and unlike centralized computing systems, they may not be as prone to catastrophic failure if one particular component ceases to function.

A network computing system may function as an information processing system. Information processing systems process information from one or more sources. In some cases, sources of information may be relatively disparate in form as well as context. For example, intelligence, surveillance, and reconnaissance (ISR) activities may use information received from a number of differing sensors. These sensors may provide information that is relatively disparate in form and/or context. Correlation of information from various sensors in an information processing system, therefore, may be relatively difficult due to the relatively diverse form and/or context of information provided.

Figure 1:
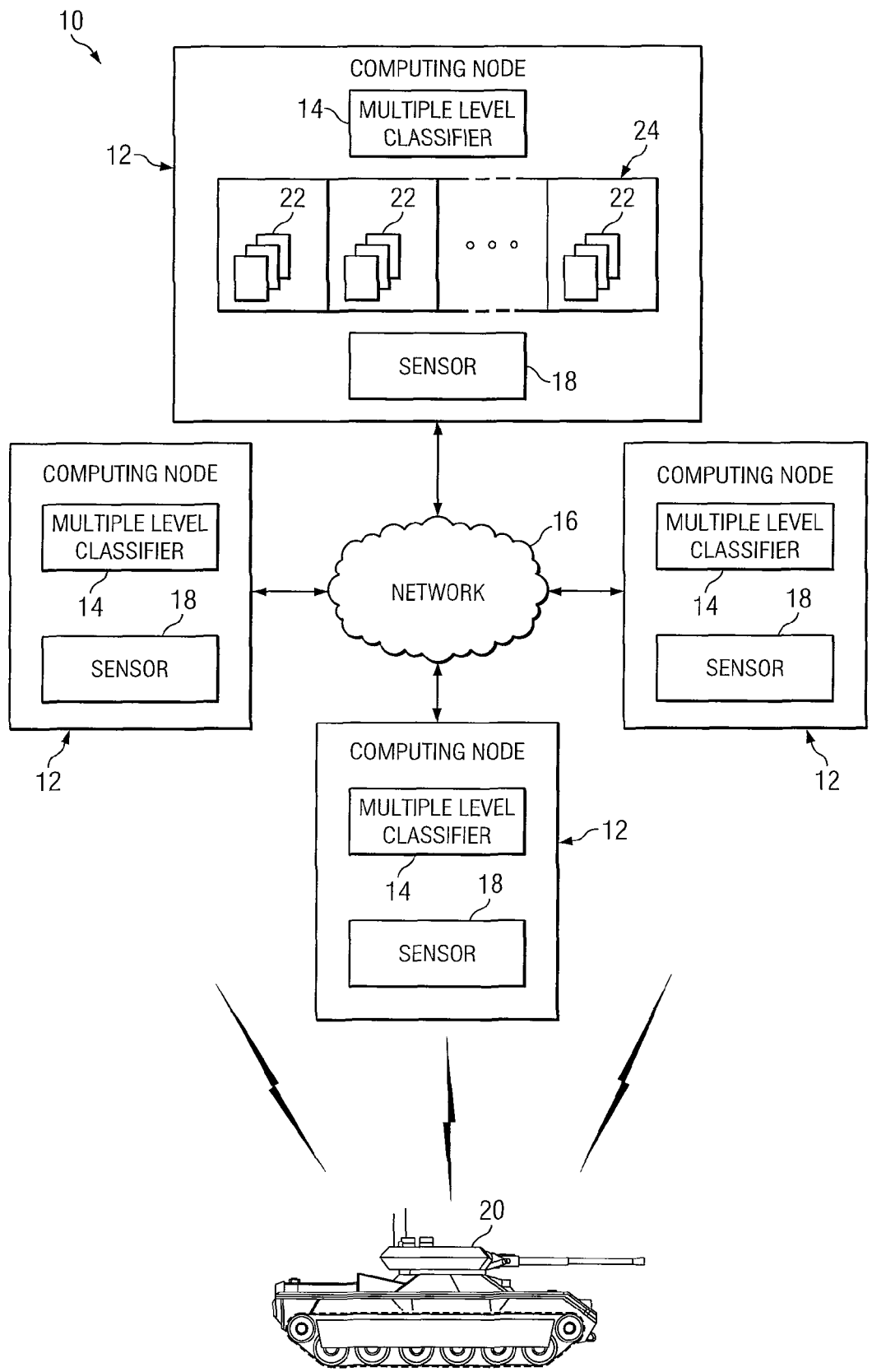
FIG. 1 is a diagram of one embodiment of an information processing system according to the teachings of the present disclosure.

FIG. 1 shows one embodiment of an information processing system 10 configured in a distributed network. Information processing system 10 includes a number of computing nodes 12 executing a multiple level classifier 14 that are coupled together through a network 16 as shown. Certain computing nodes 12 may have one or more sensors 18 for gathering information about an object 20, which may be, for example, a military tank. As will be described in detail below, multiple level classifier 14 may be executed by computing nodes 12 to classify information generated by sensors 18 into classifications with varying levels of specificity.

Sensors 18 generate records 22 from the received information and transmit these records 22 to other computing nodes 12 in the network. Computing nodes 12 bind records 22 in a number of classifications 24 according to a level of specificity. From the multiple classifications 24, enhanced information about object 20 may be determined. That is, multiple level classifier 14 may be operable to derive enhanced information from information provided by sensors 18 using a process referred to as data exploitation and mining. Data, in this sense, may generally refer to signals, images, or other relative information that may be associated with priori information or other circumstantial evidences to derive enhanced information. In some embodiments, computing nodes 12 may also determine a trajectory of object 20 from records 22 generated over a period of time.

In certain embodiments, binding of records 22 in multiple classifications 24 may be useful when the identity of the object is generally unknown. That is, information from numerous sensors 18 providing disparate information may be combined in a hierarchal manner to identify the unknown object 20. Certain embodiments of information processing system 10, therefore, may derive useful information from a relatively large amount of data provided by sensors 18 that generate information at varying levels of perception.

Computing nodes 12 may be any suitable type of computing system that execute instructions stored in a memory. Examples of computing systems may include personal computers, personal digital assistants (PDAs), laptop computers, application-specific computing units/systems, and/or mainframe computers. Network 16 in which computing nodes 12 communicate may be any suitable network, such as such as a local area network (LAN), a metropolitan area network (MAN), or a wide area network (WAN). In one embodiment, network 16 is the Internet. In another embodiment, network 16 is a wireless network in which computing nodes 12 communicate with one another using radio frequency links.

Information processing system 10 may receive information from any type of sensor 12 in the network. For example, sensors 12 may include one or more of a signal intelligence (SIGINT) sensor, such as tactical electronic reconnaissance processing and evaluation system (TERPES) sensors, team portable collection system (TPCS) sensors, radio reconnaissance equipment program (RREP) sensors, tactical control and analysis center (TCAC) sensors, mobile electronic warfare support system (MEWSS) sensors, and/or communication emitter sensing attacking system (CESAS) sensors. Sensors 12 may also include imagery intelligence (IMINT) sensors, such as manpack secondary imagery dissemination system (MSIDS) sensors, tactical exploitation group (TEG) sensors, and/or firescout unmanned aircraft system (UAS) sensors. As other examples, sensors 12 may include measurement and signal intelligence (MASINT) sensors, such as tactical remote sensor system (TRSS) sensors, expeditionary tactical area surveillance system (ETASS) sensors, or critical area protection system (CAPS) sensors. Sensors may also include human intelligence (HUMANT) sensors, such as counter intelligence and HUMANT equipment program (CIHEP) sensors.

In one embodiment, binding of records 22 in multiple classifications 24 may be performed by multiple computing nodes 12. In this manner, processing load may be distributed over a number of computing nodes 12. Individual processing nodes 12 may bind a portion of records 22 and forward these processed records 22 to another computing node 12 for processing with other records 22. Classification of records 22 by information processing system 10 will be described in detail below.

In one embodiment, information processing system 10 determines a trajectory of object 20 from records 22 received over a specified period of time. Sensors 18 may continually receive information about object 20 over time. This information may be used to generate records 22 at periodic or irregular time intervals. Information processing system 10 may use records 22 generated at differing time periods to determine a trajectory of object 20.

The trajectory of a linear system may be governed by the following equations:

$$x_t = \Phi x_{t-1} + w_{t-1} \quad (1)$$

$$w_t \sim N(0, Q) \quad (2)$$

Where:
$x_t$ is the state of one of the targets at time t;
$\Phi$ is the state transition matrix;
Q is the process noise; and
$N(m, \Sigma)$ denotes the multivariate normal distribution with mean vector m and covariance matrix $\Sigma$.

If the target is observable at time t by sensor j (which depends on the state of the track and the action selected for the sensor), then a kinematic observation ($z_{t,j}$) will be generated according to:

$$z_{t,j} = H_{t,j} x_t + v_{t,j} \quad (3)$$

$$v_{t,j} \sim N(0, R_{t,j}) \quad (4)$$

Where:
$H_{t,j}$ is the measurement transfer matrix;
$R_{t,j}$ is a measure of the accuracy of the measurement; and
$Z_t$ to be the set of all the kinematic observations of a track at time t.

$x_t$ may be generally unobservable. In one embodiment, information processing system 10 determines a trajectory of object 20 using a Kalman filter. The Kalman filter recursively estimates the trajectory of object 20 with receipt of each new record 22. The Kalman filter maintains a least-squares estimate $x(t|t) = E[x_t|Z_1, \ldots, Z_t]$ and a covariance matrix $P(t|t) = E[x(t|t)x^T(t|t)|Z_1, \ldots, Z_t]$ of the error. This is recursively maintained through the following sets of equations:

$$\hat{x}_t(-) = \Phi \hat{x}_{t-1} \quad (5)$$

$$P_t(-) = \Phi_{t-1} P_{t-1} \Phi_{t-1}^T + Q_{t-1} \quad (6)$$

$$K_t = P_t(-) H^T [H_t P_t(-) H_t^T + R]^{-1} \quad (7)$$

$$\hat{x}_t = \hat{x}_t(-) + K_t [z_t - H_t \hat{x}_t(-)] \quad (8)$$

$$P_e = [I - K_t H_t] P_t(-) \quad (9)$$

Where:
$\hat{x}_t$ is the current track estimate; and
$P_t$ is the covariance associated with that estimate.

In one embodiment, the Kalman filter may be an information form of the Kalman filter. The information form of the Kalman filter is mathematically identical to the basic Kalman filter, but the equations have been manipulated to reduce the complexity of updating the kinematic state with a new measurement. The steps of the information form of the Kalman filter are shown in the following formulae:

$$i_{j,t} = H_t^T R_{j,t}^{-1} z_{j,t}, I_{j,t} = H_t^T R_{j,t}^{-1} H_t \quad (19)$$

$$y_t(-) = Y_t(-) \Phi_{t-1} Y_t(-) y_{t-1} \quad (20)$$

$$Y_t(-) = [\Phi_{t-1} Y_{t-1}^{-1} \Phi_{t-1}^T + Q_{t-1}]^{-1} \quad (21)$$

$$y_t = y_t(-) + \sum_{j=1}^{N} i_{j,t} \quad (22)$$

$$Y_t = Y_t(-) + \sum_{j=1}^{N} I_{j,t} \quad (23)$$

For the information form of the Kalman filter, the $i_{j,t}$ and $I_{j,t}$ vectors are known as the information vectors. Individual computing nodes 12 may receive records 22 from other computing nodes 12, bind the received records 22 with other records 22, and forward the result as information vectors ($i_{j,t}$ and $I_{j,t}$) to other computing nodes 12 in the distributed network. Thus, a number of computing nodes 12 share processing load for executing the information form of the Kalman filter.

Information included in records 22 in some instances, may not be associated with any one particular object 20 during creation. That is, sensors 18 do not generally impart information about the type of object or its trajectory. To determine a trajectory of object 20, therefore, information may be associated with an existing trajectory. In one embodiment, information may be associated with an existing trajectory using a scoring algorithm. One particular suitable scoring algorithm is a Munkres algorithm. The Munkres algorithm may be applied to information included in received records 22.

For example, assume there are M workers and N tasks, and each combination MN has an associated cost $C_{MN}$. The Munkres algorithm determines which workers should perform which tasks to minimize the total cost. For the present case, the workers are existing trajectories and the tasks are newly received information in records 22. The cost $C_{MN}$ may be defined by the Mahalanobis distance, given by:

$$d_M(\vec{x}, \vec{y}) = \sqrt{(\vec{x}, \vec{y})^T \Sigma^{-1}(\vec{x} - \vec{y})} \quad (10)$$

The Mahalanobis distance may be generally similar to the Euclidean distance; the difference being the inclusion of the covariance factor $\Sigma$. The covariance factor used is that of the measurement itself. This means that if two measurements are equidistant from an existing trajectory, but each measurement has a different covariance factor $\Sigma$, the measurement with the smallest covariance factor will be associated with the trajectory. Association can be performed by either computing node 12 in information processing system 10.

Distributed classification of records 22 may be accomplished in any suitable manner. In one embodiment, distributed classification is accomplished using a Bayesian reasoning classifier. The Bayesian reasoning classifier may be implemented using confusion matrices. The klth element of $\Theta_{tj}$ gives the probability at time t that sensor j reports the track as type k when it is type l. This matrix may be generated by one or more individual computing nodes 12. The results may be communicated with other computing nodes 12 as a number labeling the appropriate row of the matrix to be used in the belief state.

The uncertainty may be modeled as a multinomial distribution; the kth element of the belief state b(t) is the belief (i.e. probability) at time t that the trajectory is type k, given all the observations that have come up to (and including) time t. If the trajectory is observable at time t by sensor j, then an identification observation ($o_{tj}$) will be produced. The belief state can then be updated according to:

$$b_t = \frac{b_{t-1} \cdot o_{tj}}{b_{t-1} o'_{tj}} \quad (11)$$

Where:
$O_t$ is the set of all the identification observations of a track at time t.

The process used to compute the elements of the confusion matrix are calculated. First, the probability that an object will be identified as class k may be determined, given that it is class k. The probability of correct identification P(k|k) is given by Johnson's criteria:

$$E = 2.7 + .7 \frac{N}{N_{50}} \quad (12)$$

$$P(k \mid k) = \frac{(N/N_{50})^E}{1 + (N/N_{50})^E} \quad (13)$$

Where:
N is the number of resolution elements on the target when the measurement is taken; and
$N_{50}$ specifies the number of resels required for a 50% chance of associating the object with the correct type.

$N_{50}$ depends on the perception level of interest. A table of values for differing levels of perception are provided in Table 1. It is assumed that all incorrect identifications are equiprobable. Therefore, the probability that class k is identified as being class l, assuming that k≠l, is:

$$P(k \mid l \neq k) = \frac{1 - P(k \mid k)}{C - 1} \quad (14)$$

Where:
C is the number of possible classes.

TABLE 1

Johnson's criteria for differing perception levels.

| | |
|---|---|
| 1.5 resels (0.75 cycles) per critical dimension | 50% detection probability |
| 3 resels (1.5 cycles) per critical dimension | 50% classification probability |
| 6 resels (3 cycles) per critical dimension | 50% recognition probability |
| 12 resels (6 cycles) per critical dimension | 50% identification probability |

Figure 2:
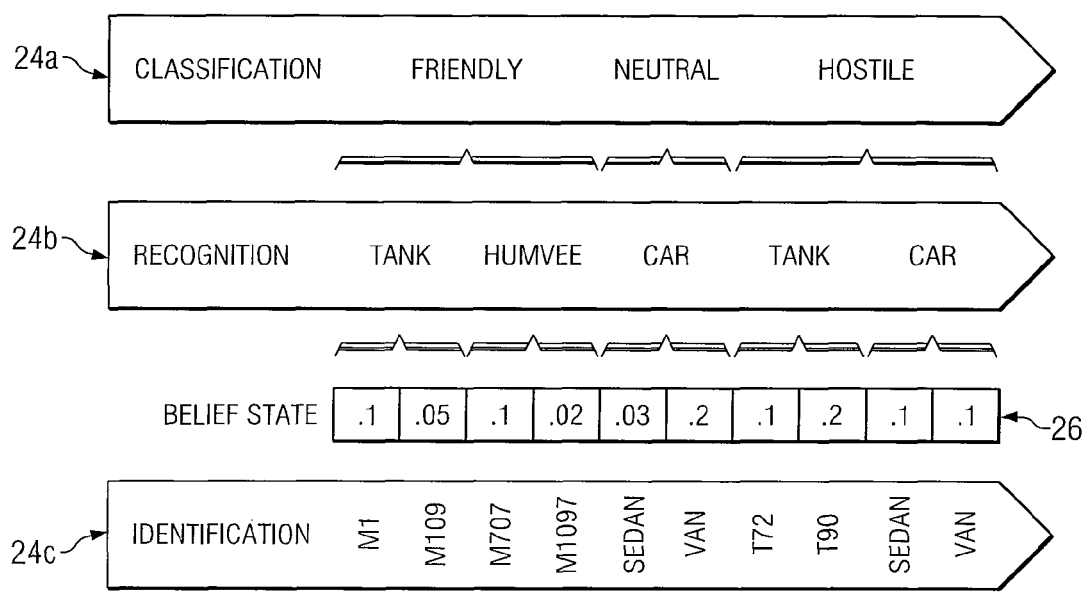
FIG. 2 is a diagram showing several classifications that may be generated by the information processing system of FIG. 1.
Figure 3:
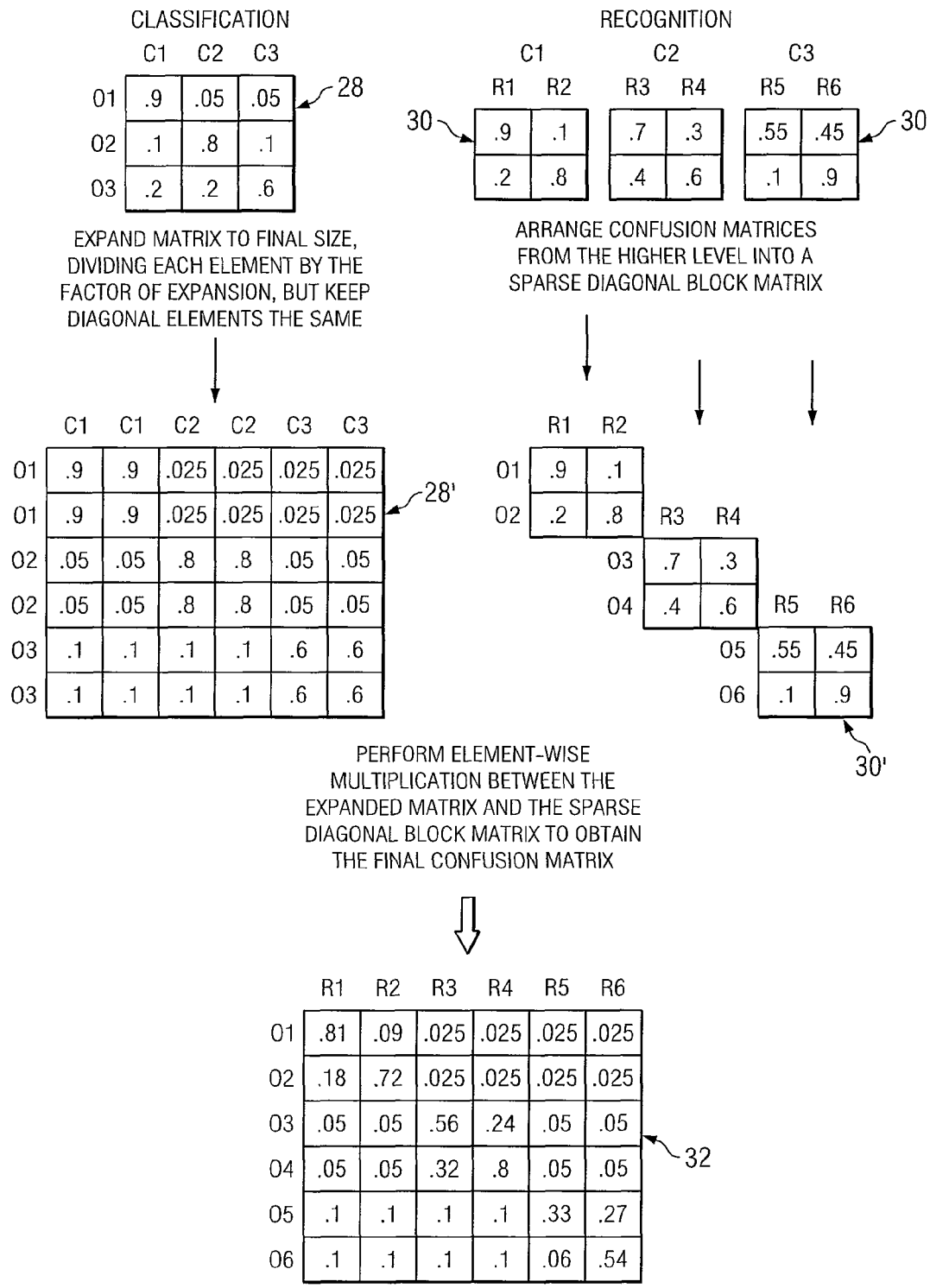
FIG. 3 shows example confusion matrices that may be generated by the information processing system of FIG. 1.

FIG. 2 is diagram showing one embodiment of a multiple level classification structure that may be generated by information processing system 10. In this particular embodiment, objects 20 (FIG. 1) may be classified in three classifications having differing levels of specificity. Each object 20 (FIG. 1) may be associated with a belief state 28 (FIG. 3). Classification 24a is a generally broad classification in which objects 20 may be classified as friendly, neutral, or hostile. Classification 24b includes criteria that is relatively more specific than classification 24a. Namely, objects 20 may be classified in classification 24b as a friendly tank, a friendly humvee, a neutral car, a hostile tank, or a hostile car. Classification 24c has relatively greater specificity than classification 24b in that objects 20 may be identified according to their type.

In practice, some objects may be misclassified at varying levels of classification. For example, a tank is more likely to be misclassified as a different type of tank rather than a type of car. Therefore, a single level of classification model may not reflect this difference. Certain embodiments may provide relatively more comprehensive classification of objects than single level classifiers. Multiple level classifier 14 provides varying levels of specificity of information about object 20. That is, multiple level classifier 14 may incorporate a hierarchical classification structure to provide enhanced contextual information about object 20.

The form of the belief state 28 for multiple level classification is one-dimensional. First, confusion matrices for each category and sub-category are constructed, which assumes that all incorrect classifications are equiprobable. Multiple level classifier 14 assumes that each record 22 includes information associated with the same object 20 as previously received. Let us call the constituent confusion matrices $\Theta_1, \ldots, \Theta_c$ and the final confusion matrix at each level $Y_L$, where c is the number of subcategories beneath the current category and L is the perception level. The recursive algorithm used to determine the confusion matrix for each level of classification is:

$$\Upsilon_0 = \begin{pmatrix} P(l_1 \mid l_1) & \cdots & P(l_1 \mid l_m) \\ \vdots & \ddots & \vdots \\ P(l_n \mid l_1) & \cdots & P(l_n \mid l_m) \end{pmatrix} \qquad (15)$$

$$\Upsilon_L = \Upsilon'_{L-1} \cdot \begin{pmatrix} \Theta_1 & 1/N_2 & \cdots & 1/N_c \\ 1/N_1 & \ddots & \ddots & \vdots \\ \vdots & \ddots & \ddots & \vdots \\ 1/N_1 & \cdots & \cdots & \Theta_c \end{pmatrix} \qquad (16)$$

$$\Upsilon'_{L-1} = \qquad (17)$$

$$\begin{pmatrix} \Upsilon_{L-1}(l_1 \mid l_1) \otimes 1_{N_1 \times N_1} & \Upsilon_{L-1}(l_n \mid l_2) \otimes 1_{N_2 \times N_2} & \cdots & \Upsilon_{L-1}(l_1 \mid l_m) \otimes 1_{N_c \times N_c} \\ \Upsilon_{L-1}(l_2 \mid l_1) \otimes 1_{N_1 \times N_1} & \ddots & \ddots & \vdots \\ \vdots & \ddots & \ddots & \vdots \\ \Upsilon_{L-1}(l_n \mid l_1) \otimes 1_{N_1 \times N_1} & \cdots & \cdots & \Upsilon_{L-1}(l_n \mid l_m) \otimes 1_{N_c \times N_c} \end{pmatrix}$$

Equation (17) yields the final confusion matrix for that particular level. The $\otimes$ symbol is the Kronecker product, and is used to repeat the elements in the parent matrix $N_c$ times, where $N_c$ is the size of the confusion matrix $\Theta_c$, $l_m$ represents the mth category of perception level 1. After the highest perception level confusion matrix has been constructed, the lower levels are expanded to have the same size using equation (17). After the confusion matrices are constructed, the belief state 28 is updated using equation (11). The confusion matrix may be associated with the perception level of the observations returned from sensors 18. This process is shown using an example described below, which constructs a confusion matrix from both classification 24 and recognition probabilities.

FIG. 3 shows an example of a number of confusion matrices that may be combined using multiple level classification. Confusion matrix 28 includes elements derived according to a relatively broad classification, such as classification 24*a*. Confusion matrices 30 include elements corresponding to newly received information from sensors 18. A final confusion matrix 32 may be generated from confusion matrix 28 and confusion matrices 30.

Final confusion matrix 32 is constructed recursively, starting with the most basic object categories and progressing through more and more specific classifications through each iteration. To generate a more specific classification, multiple level classifier 14 expands confusion matrix 28 to expanded confusion matrix 28' by dividing each element except for diagonal elements by the factor of expansion. Multiple level classifier 14 arranges confusion matrices 30 in a sparse diagonal matrix 30' as shown. Final confusion matrix 32 is formed by element-wise multiplication between expanded matrix 28' and sparse diagonal block matrix 30'.

The diagonal elements of final confusion matrix 32 indicate belief state 28 in which object 20 may be assumed to be valid. Categorical information may be extracted from belief state 28 of final confusion matrix 32 by summing classes belonging a particular category. For example, the probability of object 20 being a tank in which constituent belief states 26 indicate a 20 percent chance the object is a T72 tank, 10 percent chance it is a M1 tank, and 15 percent chance it is a M109 tank. Therefore, the chance that object 20 is a tank is simply 20 percent plus 10 percent plus 15 percent equal percent.

For a distributed network, computing nodes 12 may transmit the appropriate row from the confusion matrix 30 associated with object 20 at the measurement's position. This row will have dimension 1×C, where C is the number of classes in belief state 28. Thus, processing load may be shared among a multiple number of computing nodes 12.

Modifications, additions, or omissions may be made to information processing system 10 without departing from the scope of the disclosure. Moreover, information processing system 10 may comprise more, fewer, or other elements. For example, information processing system 10 described above generates three differing levels of classifications. In other embodiments, information processing system 10 may generate any type and number of classifications suitable for a particular application. As used in this document, "each" refers to each member of a set or each member of a subset of a set.

Figure 4:
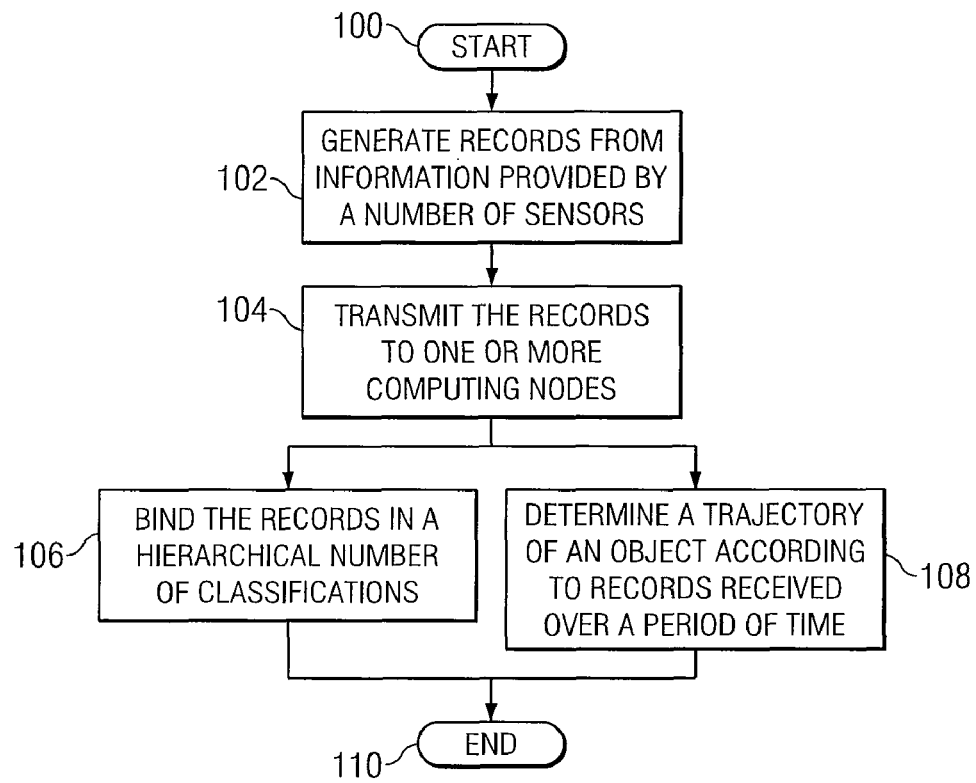
FIG. 4 is a flowchart showing one embodiment of a series of actions that may be performed by the information processing system of FIG. 1.

FIG. 4 is a flowchart showing one embodiment of a series of actions that may be performed by the information processing system 10. In act 100, the process is initiated.

In act 102, sensors 18 generate records 22 from information corresponding to a particular object 20 of interest. Information may be generally broad in context such that object 20 may be unknown. That is, the identity of object 20 may be relatively unknown using information available in any one particular record 22.

In act 104, sensors 18 transmit records 22 to one or more computing nodes 12 over network 16. In one embodiment, information processing system 10 is a distributed computing system having a number of computing nodes 12. Multiple computing nodes 12 may distribute processing load by transmitting records 22 to one another for binding a portion of records 22 generated by sensors 18.

In act 106, a computing node 12 recursively binds records 22 in a hierarchal number of classifications according to specificity. That is, computing node 12 binds records 22 with one another to classify records 22 at a first level of specificity. After a specified period of time, computing node 12 binds records 22 with a subsequently received set of records 22 in another classification having a relatively higher level of specificity.

In act 108, computing node 12 determines a trajectory of object 20 using records 22 that were received over a specified period of time. In one embodiment, computing node 12 determines the trajectory using a Kalman filter. In another embodiment, computing node 12 determines the trajectory using an information form of the Kalman filter.

To determine the trajectory, computing node 12 associates records 22 with an existing trajectory. In one embodiment, computing node 12 associates records 22 with an existing trajectory using a scoring algorithm, such as the Munkres algorithm. The Munkres algorithm calculates a Euclidean distance of information in records 22 from an existing trajectory using a covariance factor. Because the covariance factor is normally provided by the Kalman filter, the covariance factor may be used to further distinguish information in records 22.

Acts 102 through 108 may be repeatedly performed by one or more computing nodes 12 to resolve the trajectory and/or specificity of information in records 22. When operation of information processing system 10 is no longer needed or desired, the process ends in act 110.

Modifications, additions, or omissions may be made to the method without departing from the scope of the disclosure. The method may include more, fewer, or other steps. For example, the described method classifies and recursively resolves the trajectory of one particular object 20. In other embodiments, information processing system 10 may add and/or delete multiple objects with each set of records 22 received by the one or more computing nodes 12.

Figure 5:
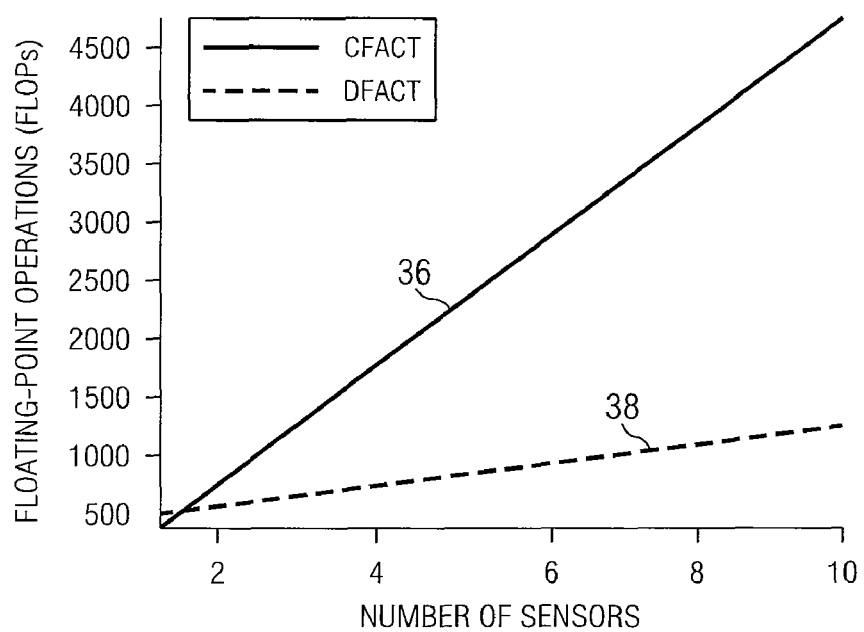
FIG. 5 is a chart comparing a resource usage of the information processing system of FIG. 1 with another information processing system configured in a centralized network.

FIG. 5 is a graph showing an estimated resource usage of information processing system 10. The graph includes several plots 36 and 38 indicating floating point operations (FLOPs) used by information processing system 10 and another information processing system configured in a centralized network. Plot 36 indicates a number of floating point operations (FLOPs) that may be executed by each computing node 12 as a function of the quantity of sensors 18 used by an information processing system configured in a centralized network. Plot 38 indicates a number of floating point operations (FLOPs) that may be executed by each computing node 12 as a function of the quantity of sensors 18 used in information processing system 10. As shown, information processing system 10 configured in a distributed network uses approximately one-fourth the number of floating point operations if ten sensors 18 are used. For an information processing system 10 having a relatively large number of sensors 18, therefore, the processing load for each processing node 12 may be reduced.

Figure 6:
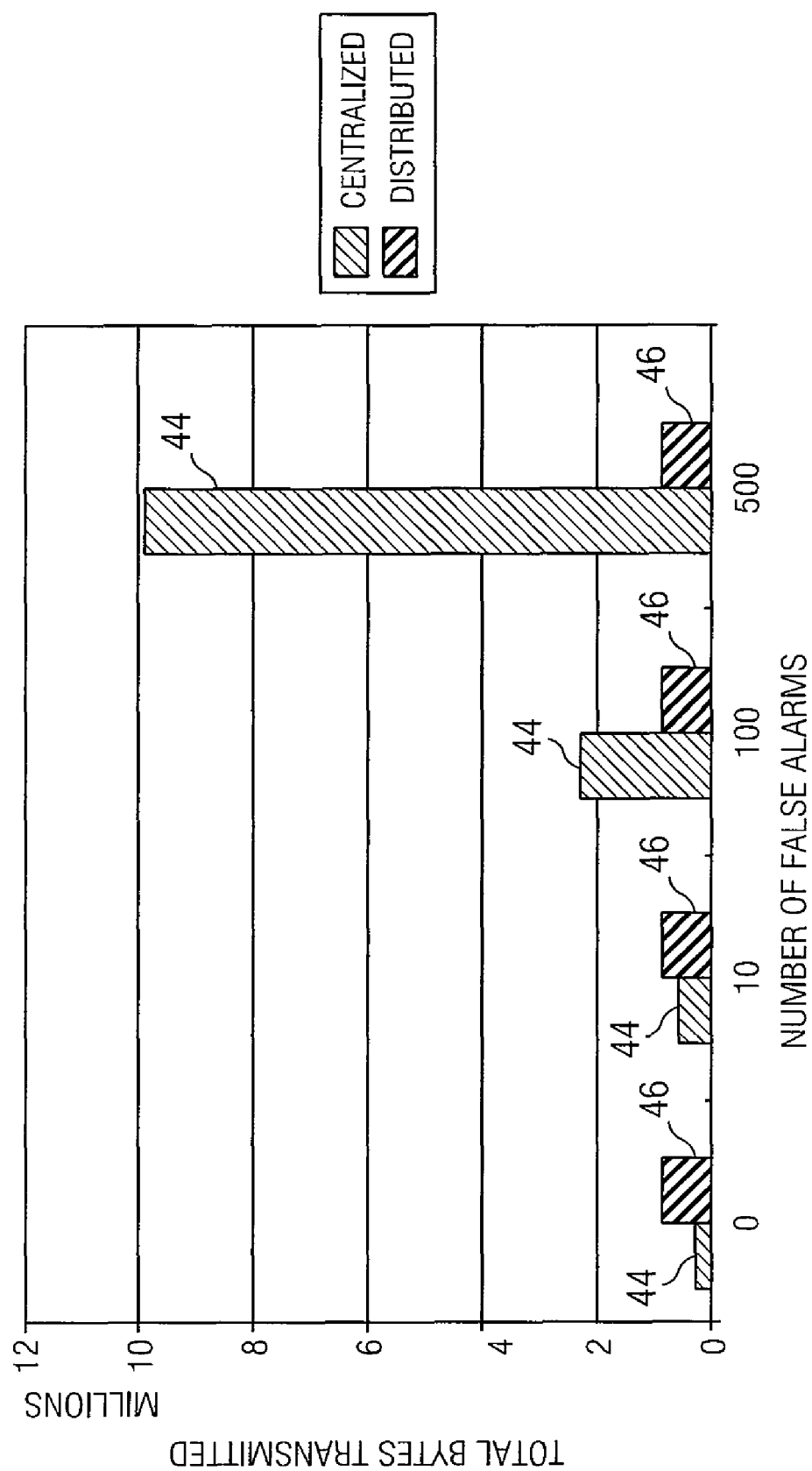
FIG. 6 is a bar chart comparing transmitted bytes of the information processing system of FIG. 1 with another information processing system configured in a centralized network.

FIG. 6 is a bar chart indicating the number of bytes transmitted between computing nodes 12 over network 16 using information processing system 10 and another information processing system configured in a centralized network. Bars 44 indicate the number of bytes transmitted using an information processing system configured in a centralized network and bars 46 indicate the number of bytes transmitted by information processing system 10. In this particular bar chart, the number of bytes transmitted is calculated as a function of the number of false alarms per record 22. In reality, information derived from sensors 18 are subject to random perturbations due to noise. Thus, partial processing of records 22 in multiple processing nodes 12 may reduce loading on network 16 using a distributed processing architecture. As shown, information processing system 10 may have relatively constant byte transmission levels regardless of the number of false alarms generated by sensors 18. The information processing system configured in a centralized network, however, may increase relative to the number of false alarms generated.

Although the present disclosure has been described in several embodiments, a myriad of changes, variations, alterations, transformations, and modifications may be suggested to one skilled in the art, and it is intended that the present disclosure encompass such changes, variations, alterations, transformations, and modifications as falling within the spirit and scope of the appended claims.

What is claimed is:

1. A distributed computer system comprising:
a plurality of sensors operable to receive information about an object and generate records from the received information;
a first computing node coupled to the plurality of sensors and operable to:
  receive a first plurality of records from the plurality of sensors;
  apply the first plurality of records to a first one or more confusion matrices;
  based on the first one or more confusion matrices, classify the object into a plurality of categories in each of a plurality of classifications, each of the plurality of classifications having a differing level of specificity, the plurality of classifications having a hierarchical classification structure; and
  based on the first one or more confusion matrices, generate a belief state that includes, for each of the plurality of categories of each of the plurality of classifications, a likelihood that the object belongs in that category;
a second computing node coupled to the plurality of sensors and the first computing node, the second computing node operable to:
  receive a second plurality of records generated by the plurality of sensors at a specified period of time after the first plurality of records were generated;
  apply the second plurality of records to a second one or more confusion matrices; and
  based on the second one or more confusion matrices, update the belief state; and
a third computing node coupled to the plurality of sensors and the first and second computing nodes, the third computing node operable to:
  receive the first plurality of records and the second plurality of records, and
  determine, using an information form of a Kalman filter, an estimated trajectory of the object according to the first plurality of records and the second plurality of records.

2. Code embodied in a non-transitory computer-readable storage media, when executed by a computer operable to perform at least the following:
receive, by a first computing node, a first plurality of records from a plurality of sensors coupled to the first computing node through a network, the plurality of sensors operable to generate the first plurality of records from information about an object;
apply the first plurality of records to a first one or more confusion matrices;
based on the first one or more confusion matrices, classify the object into a plurality of categories in each of a plurality of classifications, each of the plurality of classifications having a differing level of specificity, the plurality of classifications having a hierarchical classification structure;
based on the first one or more confusion matrices, generate a belief state that includes, for each of the plurality of categories of each of the plurality of classifications, a likelihood that the object belongs in that category;

receive, by a third computing node, the first plurality of records and a second plurality of records generated by the plurality of sensors at a specified period of time after the first plurality of records were generated, the third computing node communicating with the first computing node through the network;

determine an estimated trajectory of the object according to the first plurality of records and the second plurality of records; and associate the first plurality of records with the second plurality of records using a scoring algorithm.

3. The code of claim 2, further operable to:

receive, by a second computing node, a second plurality of records generated by the plurality of sensors at a specified period of time after the first plurality of records were generated, the second computing node communicating with the first computing node through the network;

apply the second plurality of records to a second one or more confusion matrices; and based on the second one or more confusion matrices, update the belief state.

4. The code of claim 2, further operable to determine the estimated trajectory of the object using an information form of the Kalman filter.

5. A computer system comprising:

a plurality of sensors operable to receive information about an object, the plurality of sensors operable to generate records from the received information;

a first computing node coupled to the plurality of sensors through a network and operable to:

receive a first plurality of records from the plurality of sensors;

apply the first plurality of records to a first one or more confusion matrices;

based on the first one or more confusion matrices, classify the object into a plurality of categories in each of a plurality of classifications, each of the plurality of classifications having a differing level of specificity, the plurality of classifications having a hierarchical classification structure; and based on the first one or more confusion matrices, generate a belief state that includes, for each of the plurality of categories of each of the plurality of classifications, a likelihood that the object belongs in that category; and a third computing node coupled to the first computing node and the plurality of sensors through the network, the third computing node operable to:

receive the first plurality of records and a second plurality of records generated by the plurality of sensors at a specified period of time after the first plurality of records were generated; and determine an estimated trajectory of the object according to the first plurality of records and the second plurality of records, wherein the third computing node is further operable to associate the first plurality of records with the second plurality of records using a scoring algorithm.

6. The computer system of claim 5, further comprising a second computing node coupled to the first computing node and the plurality of sensors through the network, the second computing node operable to:

receive a second plurality of records generated by the plurality of sensors at a specified period of time after the first plurality of records were generated;

apply the second plurality of records to a second one or more confusion matrices; and based on the second one or more confusion matrices, update the belief state.

7. The computer system of claim 5, wherein the third computing node is further operable to determine the estimated trajectory of the object using an information form of the Kalman filter.

8. The computer system of claim 5, wherein the first computing node is further operable to classify the object into the plurality of categories in each of the plurality of classifications by recursively combining the first one or more confusion matrices.

9. A method comprising:

receiving, by a first computing node, a first plurality of records from a plurality of sensors coupled to the first computing node through a network, the plurality of sensors operable to generate the first plurality of records from information about an object;

applying, by the first computer node, the first plurality of records to a first one or more confusion matrices;

based on the first one or more confusion matrices, classifying, by the first computer node, the object into a plurality of categories in each of a plurality of classifications, each of the plurality of classifications having a differing level of specificity, the plurality of classifications having a hierarchical classification structure;

based on the first one or more confusion matrices, generating, by the first computer node, a belief state that includes, for each of the plurality of categories of each of the plurality of classifications, a likelihood that the object belongs in that category;

receiving, by a third computing node the first plurality of records and a second plurality of records generated by the plurality of sensors at a specified period of time after the first plurality of records were generated, the third computing node communicating with the first computing node through the network;

determining, by the third computing node, an estimated trajectory of the object according to the first plurality of records and the second plurality of records; and associating, by the third computing node, the first plurality of records with the second plurality of records using a scoring algorithm.

10. The method of claim 9, further comprising:

receiving, by a second computing node a second plurality of records generated by the plurality of sensors at a specified period of time after the first plurality of records were generated, the second computing node communicating with the first computing node through the network;

applying, by the second computing node, the second plurality of records to a second one or more confusion matrices; and based on the second one or more confusion matrices, updating, by the second computing node, the belief state.

11. The method of claim 9, further comprising determining, by the third computing node, the estimated trajectory of the object using an information form of the Kalman filter.

* * * * *